United States Patent
Morris et al.

(10) Patent No.: US 7,724,698 B2
(45) Date of Patent: May 25, 2010

(54) MODULATION AND CODING ADJUSTMENT BASED ON SLANT RANGE CHARACTERISTICS FOR SATELLITE DOWNLINKS

(75) Inventors: Rodney A. Morris, Lawrenceville, GA (US); John R. Zlogar, Atlanta, GA (US); Mark J. Vanderaar, Medina, OH (US)

(73) Assignee: ViaSat, Inc., Carlsbad, CA (US)

( * ) Notice: Subject to any disclaimer, the term of this patent is extended or adjusted under 35 U.S.C. 154(b) by 309 days.

(21) Appl. No.: 11/970,637

(22) Filed: Jan. 8, 2008

(65) Prior Publication Data

US 2008/0165840 A1   Jul. 10, 2008

Related U.S. Application Data

(60) Provisional application No. 60/883,934, filed on Jan. 8, 2007.

(51) Int. Cl.
   *H04B 7/185* (2006.01)
(52) U.S. Cl. .................................... 370/316; 370/332
(58) Field of Classification Search ................. 370/316, 370/389, 332, 329, 341, 349; 375/315
   See application file for complete search history.

(56) References Cited

U.S. PATENT DOCUMENTS

| | | | |
|---|---|---|---|
| 5,345,245 A * | 9/1994 | Ishikawa et al. | 342/357.03 |
| 7,047,029 B1 | 5/2006 | Godwin et al. | |
| 7,394,780 B1 * | 7/2008 | Gregory et al. | 370/316 |
| 7,512,198 B2 * | 3/2009 | Strodtbeck et al. | 375/349 |
| 2002/0058505 A1 | 5/2002 | Young et al. | |

OTHER PUBLICATIONS

International Search Report and Written Opinion, dated Dec. 8, 2008, in corresponding PCT Application No. PCT/US2008/050498, filed Jan. 8, 2008, 7 pages.

* cited by examiner

*Primary Examiner*—Brenda Pham
(74) *Attorney, Agent, or Firm*—Townsend and Townsend and Crew LLP

(57) ABSTRACT

A satellite communications system adjusts a modulation and coding format for a downlink based on the slant range distance from the satellite to the receiving ground terminal. Modulation and coding formats are each associated with different sets of slant range distances. An estimated slant range from a satellite to a receiving ground terminal for a time period is determined, and the modulation and coding format associated with that slant range distance is identified. Data may then be transmitted by the satellite to the receiving ground terminal using the identified modulation and coding format for the time period. Additional factors may be considered in identifying the applicable modulation and coding format to be used.

21 Claims, 12 Drawing Sheets

| Elev (Deg) | Slant Range (Km) | Modulation and Coding Format |
|---|---|---|
| ≤ 4 | ≥1917 | QPSK 1/4 |
| ≤ 5 | 1810 — 1916 | QPSK 2/5 |
| ≤ 6 | 1703 — 1809 | QPSK 1/2 |
| ≤ 8 | 1596 — 1702 | QPSK 3/5 |
| ≤ 9 | 1491 — 1595 | QPSK 3/4 |
| ≤ 11 | 1386 — 1490 | 8PSK 3/5 |
| ≤ 13 | 1283 — 1385 | 8PSK 2/3 |
| ≤ 15 | 1181 — 1282 | 8PSK 5/6 |
| ≤ 18 | 1081 — 1180 | 8PSK 8/9 |
| ≤ 20 | 984 — 1080 | 8PSK 9/10 |
| ≤ 24 | 891 — 983 | 16APSK 2/3 |
| ≤ 27 | 804 — 890 | 16APSK 2/3 |
| ≤ 31 | 723 — 803 | 16APSK 3/4 |
| ≤ 36 | 653 — 722 | 16APSK 4/5 |
| ≤ 40 | 597 — 652 | 16APSK 5/6 |
| ≤ 44 | 559 — 596 | 16APSK 8/9 |
| ≤ 45 | 542 — 558 | 16APSK 9/10 |

FIG. 2B 210-b → Modulation and Coding Format

280 → Timing

| Modulation and Coding Format | Timing |
|---|---|
| QPSK 1/4 | $T_1$-$T_2$ |
| QPSK 2/5 | $T_2$-$T_3$ |
| QPSK 1/2 | $T_3$-$T_4$ |
| QPSK 3/5 | $T_4$-$T_5$ |
| QPSK 3/4 | $T_5$-$T_6$ |
| 8PSK 3/5 | $T_6$-$T_7$ |
| 8PSK 2/3 | $T_7$-$T_8$ |
| 8PSK 5/6 | $T_8$-$T_9$ |
| 8PSK 8/9 | $T_9$-$T_{10}$ |
| 8PSK 9/10 | $T_{10}$-$T_{11}$ |
| 16APSK 2/3 | $T_{11}$-$T_{12}$ |
| 16APSK 2/3 | $T_{12}$-$T_{13}$ |
| 16APSK 3/4 | $T_{13}$-$T_{14}$ |
| 16APSK 4/5 | $T_{14}$-$T_{15}$ |
| 16APSK 5/6 | $T_{15}$-$T_{16}$ |
| 16APSK 8/9 | $T_{16}$-$T_{17}$ |
| 16APSK 9/10 | $T_{17}$-$T_{18}$ |
| 16APSK 9/10 | $T_{18}$-$T_{19}$ |
| 16APSK 8/9 | $T_{19}$-$T_{20}$ |
| 16APSK 5/6 | $T_{20}$-$T_{21}$ |
| 16APSK 4/5 | $T_{21}$-$T_{22}$ |
| 16APSK 3/4 | $T_{22}$-$T_{23}$ |
| 16APSK 2/3 | $T_{23}$-$T_{24}$ |
| 16APSK 2/3 | $T_{24}$-$T_{25}$ |
| 8PSK 9/10 | $T_{25}$-$T_{26}$ |
| 8PSK 8/9 | $T_{26}$-$T_{27}$ |
| 8PSK 5/6 | $T_{27}$-$T_{28}$ |
| 8PSK 2/3 | $T_{28}$-$T_{29}$ |
| 8PSK 3/5 | $T_{29}$-$T_{30}$ |
| QPSK 3/4 | $T_{30}$-$T_{31}$ |
| QPSK 3/5 | $T_{31}$-$T_{32}$ |
| QPSK 1/2 | $T_{32}$-$T_{33}$ |
| QPSK 2/5 | $T_{33}$-$T_{34}$ |
| QPSK 1/4 | $T_{34}$-$T_{35}$ |

MODULATION AND CODING ADJUSTMENT BASED ON SLANT RANGE CHARACTERISTICS FOR SATELLITE DOWNLINKS

CROSS REFERENCES

This application claims priority from U.S. Provisional Patent Application No. 60/883,934 filed Jan. 8, 2007, entitled "PREDETERMINED MODULATION AND CODING ADJUSTMENT FOR REMOTE SENSING SATELLITE DOWNLINKS", which is incorporated herein by reference in its entirety.

BACKGROUND

The present invention relates to wireless communications in general and, in particular, to the adjustment of modulation and coding for satellite downlinks.

Remote sensors are often placed on low earth orbit (LEO) satellites to gather information about earth, weather, and space. Many remote sensors gather information by sensing different wavelengths of electromagnetic waves emitted from an object of interest. One common use is satellite imaging to map, measure, or otherwise monitor the earth. Other remote sensing systems may measure sounds, or variations in magnetic or gravitational fields. Remote sensing satellites are typically in low earth orbit, and often transmit the data gathered with the remote sensors to ground terminals at locations on earth.

These transmissions may be bandwidth limited, and often operate within a 400 MHz bandwidth in the X-band. This can present a limitation on the amount of data that may be transmitted to the ground terminals. Other types of satellite transmissions (e.g., with other types of sensors) may have similar bandwidth limitations. It may, therefore, be desirable to identify novel methods that may be used to improve the bandwidth efficiency of a system for data transmission in a downlink of a communications satellite.

SUMMARY

Satellite systems, devices, and methods are described to adjust a modulation and coding format for a downlink based on the slant range distance from the satellite to the receiving ground terminal. In one embodiment, each of a number of modulation and coding formats is associated with a different set of slant range distances. The slant range from a satellite to a receiving ground terminal is determined, and the modulation and coding format associated with that slant range distance is identified. Data may then be transmitted by the satellite to the receiving ground terminal using the identified modulation and coding format. In some embodiments, additional factors may be considered in identifying the applicable modulation and coding format to be used.

In one set of embodiments, a satellite communications system includes a ground terminal in communication with a low earth orbit (LEO) satellite. The ground terminal is configured to associate each of a number of modulation and coding formats with a different set of slant range distances. The ground terminal then identifies a slant range distance between the LEO satellite and the ground terminal. The ground terminal selects the set of slant range distances including the identified slant range distance. The ground terminal identifies the modulation and coding format associated with the selected set of slant range distances, and transmits a signal identifying the selected modulation and coding format to the LEO satellite.

The LEO satellite, in wireless communication with the ground terminal, receives the signal identifying the selected modulation and coding format from the ground terminal. The LEO satellite transmits a signal (e.g., including remote sensing data) to the ground terminal utilizing the selected modulation and coding format.

In another set of embodiments, the ground terminal is again configured to associate each of a number of modulation and coding formats with a different set of slant range distances. A number of slant range distances between the LEO satellite and a receiving terminal may be determined for specific times of an orbital pass. The ground terminal then identifies time periods associated with each set of slant range distances. The ground terminal associates each of the identified time periods with a selected one of the modulation and coding formats. A schedule of the selected modulation and coding formats and associated time periods may be generated and transmitted to a LEO satellite. Using the schedule, the satellite may apply the selected modulation and coding formats at the associated time periods.

In the above sets of embodiments, a ground terminal may measure or otherwise estimate a signal quality metric (e.g., related to bit-error rate, signal-to-noise ratio, propagation loss, weather or interference conditions, etc.) for a signal to be received from the LEO satellite. The selected modulation and coding format may be changed dynamically (e.g., in real-time) based on the measured signal quality. In addition, the distances attributed to the different sets of slant range distances may be varied based on the measured signal quality. Similarly, the times associated with modulation and coding formats may be modified based on the signal quality metrics.

The ground terminal may transmit a changed modulation and coding format to the LEO satellite due to the modification to the selected set of slant range distances. The LEO satellite may utilize the changed modulation and coding format on a current orbit over the ground terminal. The characteristics of the receiver and antenna at the ground terminal may be used in the determination of the particular modulation and coding format to be used. It is worth noting that, in other sets of embodiments, functions described as being performed by the receiving ground terminal may be performed, in whole or in part, by one or more other ground terminals or by the LEO satellite.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIGS. 2A and 2B illustrate examples of a coding and modulation table that may be used to implement adjustable coding and modulation according to various embodiments of the present invention;

FIG. 2C illustrates an example of a coding and modulation schedule that may be used to implement adjustable coding and modulation according to various embodiments of the present invention;

DETAILED DESCRIPTION OF THE INVENTION

A satellite communications system is programmed to adjust a modulation and coding format for a downlink from the satellite to the receiving ground terminal based on the slant range distance. In one embodiment, each of a number of available modulation and coding formats is associated with a different set of slant range distances. For example, shorter slant range distances may be associated with higher order modulation and higher rate coding formats. Thus, shorter slant range distances may be paired with formats having greater information density. The slant range from a satellite to a receiving ground terminal for a particular period of time is determined, and the modulation and coding format associated with that slant range distance is identified. Data may then be transmitted by the satellite to the receiving ground terminal during that period of time using the identified modulation and coding format.

This description provides example embodiments only, and is not intended to limit the scope, applicability, or configuration of the invention. Rather, the ensuing description of the embodiments will provide those skilled in the art with an enabling description for implementing embodiments of the invention. Various changes may be made in the function and arrangement of elements without departing from the spirit and scope of the invention.

Thus, various embodiments may omit, substitute, or add various procedures or components as appropriate. For instance, it should be appreciated that in alternative embodiments, the methods may be performed in an order different than that described, and that various steps may be added, omitted, or combined. Also, features described with respect to certain embodiments may be combined in various other embodiments. Different aspects and elements of the embodiments may be combined in a similar manner.

It should also be appreciated that the following systems, devices, methods, and software may each be a component of a larger system, wherein other procedures may take precedence over or otherwise modify their application. Also, a number of steps may be required before, after, or concurrently with the following embodiments.

Figure 1:
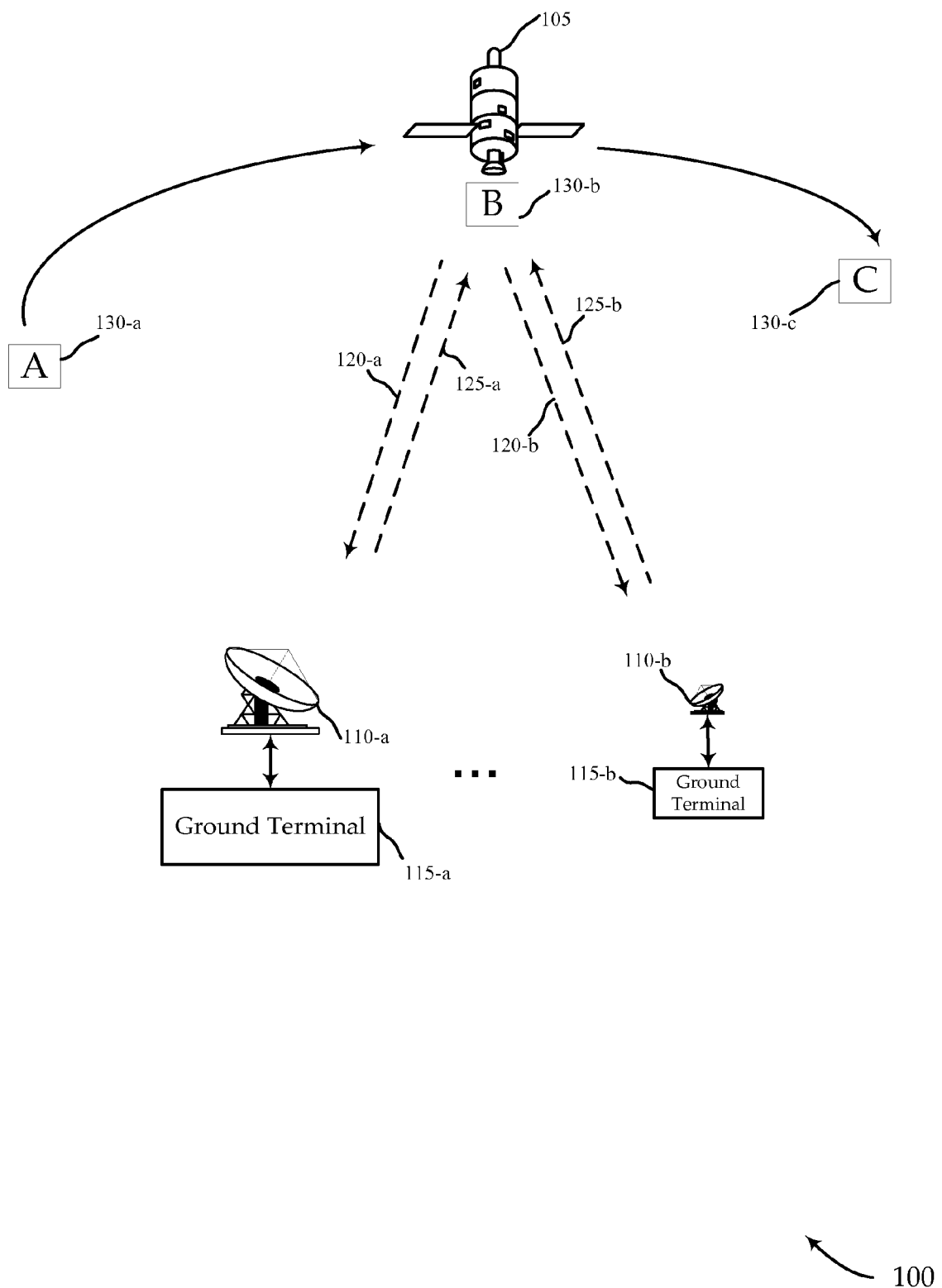
FIG. 1 is a block diagram illustrating a satellite communications system with adjustable coding and modulation implemented according to various embodiments of the present invention.

Novel systems, methods, devices, and software are described which may adjust the modulation or coding format for a downlink in a remote sensing satellite system. FIG. 1 is a block diagram illustrating an example of a remote sensing satellite communications system 100 configured according to various embodiments of the invention. While a remote sensing low earth orbit (LEO) satellite communications system is used to illustrate various aspects of the invention, it is worth noting that the principles set forth herein are applicable to a variety of other satellite and communications systems, as well.

In one embodiment, the satellite 105 is a LEO satellite configured with one or more sensors to receive and measure electromagnetic waves from earth. In other embodiments, other types of earth, weather, or space sensors known in the art may be used, including radiometers, photometers, or various other imaging or scanning mechanisms. Also, other geodetic and acoustic sensors may be used, and the sensors may be passive or active. The data produced by the sensors may then be transmitted by the satellite 105 to one or more ground terminals 115 through ground terminal antennas 110.

The satellite 105 may transmit a signal 120 with a modulation and coding format adjusted to the link conditions (e.g., slant range distance and, perhaps, other factors) between the satellite and the ground terminal antenna(s) 110. A ground terminal 115 may be configured to receive sensing signals 120 from the satellite 105. In one embodiment, the ground terminal antenna 110 is a parabolic reflector. However, the antenna 110 may be implemented in a variety of alternative configurations. The ground terminal 115 may then transmit the received sensing data over a network (e.g., the Internet or any other network), or may otherwise process, store, or forward it.

The modulation and coding format for a signal 120 may be adjusted to account for different slant range distances and other factors, such as weather and interference conditions. Other adjustments are possible, as well. For example, as illustrated in FIG. 1, different ground terminals 115 may be different distances away from the direct path of the satellite 105. Thus, the pass of a satellite that orbits directly above a ground terminal 115 may be characterized as making a "ninety degree pass," while those making passes further away may be characterized by the degree above the horizon as they pass (e.g., "seventy degree pass" or forty-five degree pass"). The elevation degree pass for an orbiting satellite may be used to identify the modulation and coding format associated with a particular slant range distance (e.g., a seventy degree pass satellite may have different modulation and coding associations for a particular slant range distance than a forty-five degree pass satellite). Ground terminals 115 may also have different capabilities (e.g., different equalizers, amplifiers, etc.). Thus, in some embodiments, the modulation and coding format may be adjusted to account for the ground terminal 115 and antenna 110 capabilities, as well.

In addition to receiving wireless signals from the satellite 105, a ground terminal 115 may generate and transmit wireless signals 125 to the satellite 105 via the antenna 110. For example, the ground terminal 115 may be configured to process information on the timing and slant distances associated with a future orbital pass. The ground terminal 115 may generate a schedule for modulation and coding format adjustments, and transmit the generated schedule to the satellite 105 before an orbital pass. The ground terminal 115 may be configured to dynamically modify the schedule according to current conditions (e.g., interference or other signal quality conditions). The ground terminal 115 may function as a gateway, generating and transmitting schedule information to a satellite 105 on behalf of other ground terminals 115. Alternatively, a ground terminal 115 may simply function as a receiving terminal, and not necessarily transmit scheduling information to the satellite.

Any number of packet addressing and formatting schemes may be used to direct packets accordingly, and otherwise provide data security on the uplink, downlink, or thereafter through the network. Various channelization schemes may be used, such as Time Division Multiple Access (TDMA), Frequency Division Multiple Access (FDMA), Orthogonal Frequency Division Multiple Access (OFDMA), Code Division Multiple Access (CDMA), or any number of hybrid or other schemes known in the art. A variety of physical layer transmission modulation and coding techniques may be used with certain embodiments of the invention, including those defined with the DVB-S2 and WiMAX standards.

The satellite 105 may be configured to receive wireless signals from the ground terminals, or other sources. The signals may be received via antennas connected with the satellite 105. The satellite 105 may receive and process signals received from a ground terminal 115 (e.g., telecommands from a telemetry ground station), and modify its direction and speed of travel, its sensors, or its transmitters in accordance with the received signals. As noted above, a satellite may also receive a schedule generated by a ground terminal 115 indicating the appropriate modulation and coding formats to be used at different times.

As noted, in one embodiment the satellite 105 is a LEO orbiting around the earth, passing ground terminals 115 as it orbits. FIG. 1 illustrates one such orbit, passing from a point low on the horizon, labeled point A 130-a, to point B 130-b above ground terminal 115-a, and then continuing on past the ground terminal to point C 130-c to begin to descend back over the horizon. Given this orbit pattern, as a satellite 105 comes into range of a ground terminal 110, the slant range distance between the satellite 105 and ground terminal 115 (i.e., line-of-sight distance between them) will initially decrease, before again increasing as the satellite continues across the horizon. As the slant range decreases, the modulation and coding format needed to transmit data reliably within a given reliability margin may change to a higher order modulation and higher rate coding format.

As is evident to those skilled in the art, wireless signals decrease in power as they travel over distances due to path loss. This attenuation means that a higher order modulation and coding format may be sufficiently reliable over shorter distances, while a lower order modulation and coding format may be needed to attain the same reliability over longer distances. The term "higher order modulation and coding format" may be used hereinafter to indicate a relatively higher order modulation and higher rate coding format. Similarly, the term "lower order modulation and coding format" may be used hereinafter to indicate a relatively lower order modulation and lower rate coding format (e.g., a QPSK1/4 modulation and coding format is a lower order modulation and coding format than QPSK9/10 modulation and coding format).

Using a higher order modulation and coding format over the shorter distances may increase the spectral efficiency, allowing more bits to be transmitted per symbol. This is illustrated Table 1, which shows calculations for purposes of example only.

TABLE 1

| Modulation | Coding | Pilot Tones | Spectral Efficiency |
| --- | --- | --- | --- |
| QPSK | 1/4 | On | 0.49 |
| QPSK | 1/3 | On | 0.66 |
| QPSK | 2/5 | On | 0.79 |
| QPSK | 1/2 | Off | 0.99 |
| QPSK | 3/5 | Off | 1.19 |
| QPSK | 2/3 | Off | 1.32 |
| QPSK | 3/4 | Off | 1.49 |
| QPSK | 4/5 | Off | 1.59 |
| QPSK | 5/6 | Off | 1.65 |
| QPSK | 8/9 | Off | 1.77 |
| QPSK | 9/10 | Off | 1.79 |
| 8PSK | 3/5 | On | 1.78 |
| 8PSK | 2/3 | On | 1.98 |
| 8PSK | 3/4 | On | 2.23 |
| 8PSK | 5/6 | On | 2.48 |
| 8PSK | 8/9 | Off | 2.65 |
| 8PSK | 9/10 | Off | 2.68 |
| 16APSK | 2/3 | On | 2.64 |
| 16APSK | 3/4 | On | 2.97 |
| 16APSK | 4/5 | On | 3.17 |
| 16APSK | 5/6 | On | 3.30 |
| 16APSK | 8/9 | On | 3.52 |
| 16APSK | 9/10 | On | 3.57 |

Therefore, according to various embodiments of the invention, the transmitter on a satellite 105 may be configured to adjust the modulation and coding format based at least in part on the slant range distance. In one embodiment, the ground terminal 115 may generate a timing schedule before an orbital pass, and the schedule may be transmitted to the satellite before or during an orbital pass. Some portion of the adjustment parameters may be preprogrammed into a transmitter before deployment of a satellite 105, and may be modified once a satellite is deployed (e.g., with commands from ground terminal 115, or otherwise). Thus, while a satellite 105 may simply receive an adjustment schedule, it may be configured with additional processing capabilities. In one embodiment, a satellite 105 may be configured to keep track of ground terminal 115 location and slant range distance, and adjust the modulation and coding format to maintain a given reliability margin. A satellite 105 may determine that an adjustment to a modulation and coding format is called for because of a change in slant range distance. The modulation and coding format may be adjusted accordingly, and an adjustment to the data rate may be implemented concurrently. One manner in which this may be accomplished is with a modulation and coding format table, where different slant range distances are associated with different modulation and coding formats.

By way of example, the process may be initiated by identifying a path loss factor. The path loss factor may represent a calculation to be applied that estimates the attenuation of a signal from a satellite to a ground terminal based on distance. A number of such calculations are known in the art, and may be used. In addition to the path loss factor, additional factors may be identified which modify the path loss factor based on characteristics of a given ground terminal 115. Such factors may, for example, include weather patterns, natural and man made objects, interference conditions, and other factors specific to a particular ground terminal 115. In other embodiments, other considerations may be used to modify signal quality calculation, such as time of day, time of year, type of data, reliability requirements, QoS guarantees, etc. Using the path loss factor, reliability minimums, and perhaps the other factors, an association between sets of slant range distances and various modulation and coding formats may be established.

Continuing with the above example, the satellite 105 sensors collect information, which is processed to create sensing data. A slant range distance for the particular ground terminal 115 (i.e., the line of sight distance from the satellite 105 to the ground terminal 115) at a time or set of times is determined. The determined slant range distance is applied to the association between sets of slant range distances and various modulation and coding formats. The highest order modulation and coding format that may transmit the data with sufficient reliability is identified. In this way, the spectral efficiency can be tailored to the link conditions (e.g., the slant rage distance) of the link between the satellite and the particular ground terminal, and the data rate can be modified accordingly.

Figure 2A:
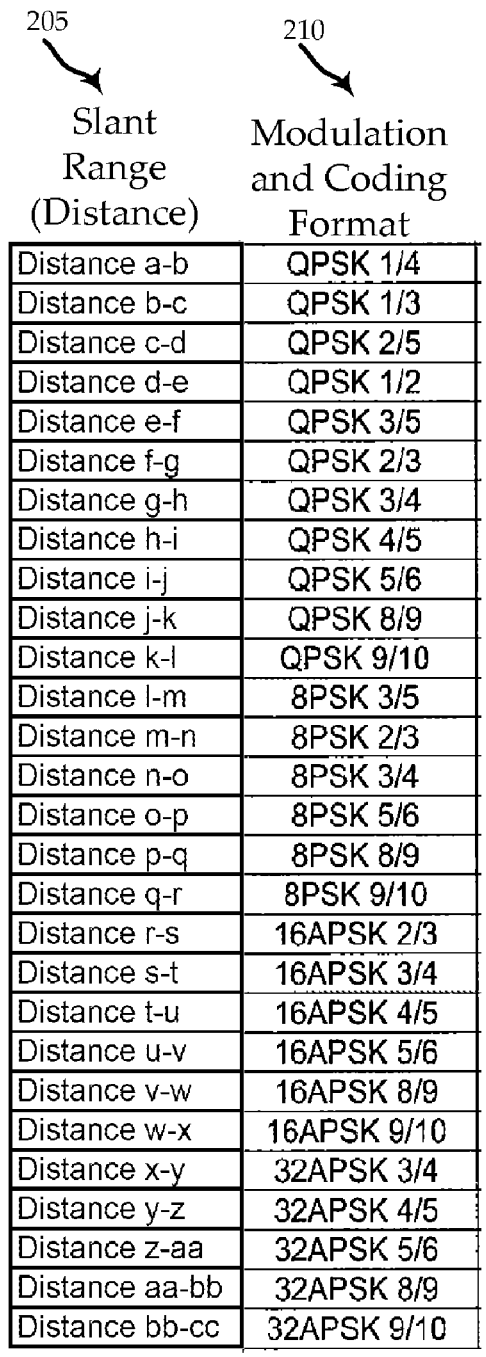
Figure 2A:

Referring to FIG. 2A, an example of a table 200 is illustrated in the form of a block diagram. This type of modulation and coding format table 200 may, for example, be used by scheduler unit on a ground terminal 115 and/or a microprocessor on a satellite 105 to determine the modulation and coding format to be used for sensing data 120 to be transmitted over a given slant range distance. The table 200 contains a column listing a number of modulation and coding formats 210. Each modulation and coding format entry 210 corresponds to a set of distances 205. Thus, using the slant range distance attributed to a destination ground terminal 115, an entry for a set of distances 205 encompassing the slant range over the particular link may be identified, and the appropriate modulation and coding format may be selected. For example, if a destination link has a slant range distance that falls within distance g-h, the modulation and coding format QPSK 3/4 may be used. In one embodiment, each set of distances is identified by calculating the highest order modulation and coding format that can be transmitted within a certain reliability margin (e.g., with a 10 mm/hr rain consideration).

In other embodiments, other metrics and indicators may be used in addition to or in place of slant range distance. For example, 1) elevation degree for a satellite pass, 2) historic, current, or forecast weather patterns or conditions, 3) natural and man made objects, 4) historic, current, or estimated interference conditions, 5) other factors specific to a particular ground terminal 115 (e.g., antenna size or configuration, receiver component characteristics), and 6) quality of service (QoS) or traffic characteristics, may be factored into the modulation and coding format table. More global considerations may include time of day, time of year, type of data, etc. It is also worth noting that a number of other data structures may also be used to relate slant range to modulation and coding formats. In still other embodiments, other information density parameters, in addition to modulation and coding format changes may be added to further adapt a signal to environmental or other conditions.

Referring next to FIG. 2B, an example of a table 250 is illustrated in the form of a block diagram. This modulation and coding format table 250 may be the table 200 of FIG. 2A and, thus, may be used by a ground terminal 115 or a satellite 105 to determine the modulation and coding format for a given set of slant range distances. The table contains a column listing a number of modulation and coding formats 210-*a*. Each modulation and coding format entry 210-*a* corresponds to a set of distances 205-*a* (and an elevation degree 255) for a satellite 105 making a forty-five degree pass over a ground terminal 115. Thus, using the slant range distance attributed to a forty-five degree ground terminal 115, an entry for a set of distances 205-*a* encompassing the slant range distance for a particular link (and time) may be identified, and the appropriate modulation and coding format may be selected. For example, if a destination link has a slant range distance 1400 km, the modulation and coding format 8PSK 3/5 may be used. For a satellite 105 making a ninety degree pass over a ground terminal 115, the applicable modulation and coding format may be different even over the same slant range distance.

Referring next to FIG. 2C, an example of a table 275 is illustrated in the form of a block diagram. This modulation and coding format table 275 may be generated from the table 250 of FIG. 2B and, thus, may be generated by a ground terminal 115 or a satellite 105 to determine the modulation and coding format adjustments at certain times. The table contains a column listing a number of modulation and coding formats 210-*b*. Each modulation and coding format entry 210 corresponds to a set of times 280 for a satellite 105 passing at forty-five degrees over a ground terminal 115 to transmit using certain modulation and coding formats. Thus, times for slant range distances in a given orbital pass may be identified by a ground terminal 115 or a satellite 105. Using the slant range distances and times, a schedule of adjustment to an appropriate modulation and coding format may be determined. If the table 275 is generated by the ground terminal 115, it may be transmitted to the satellite 105 before (or during) the orbital pass.

Figure 3A:
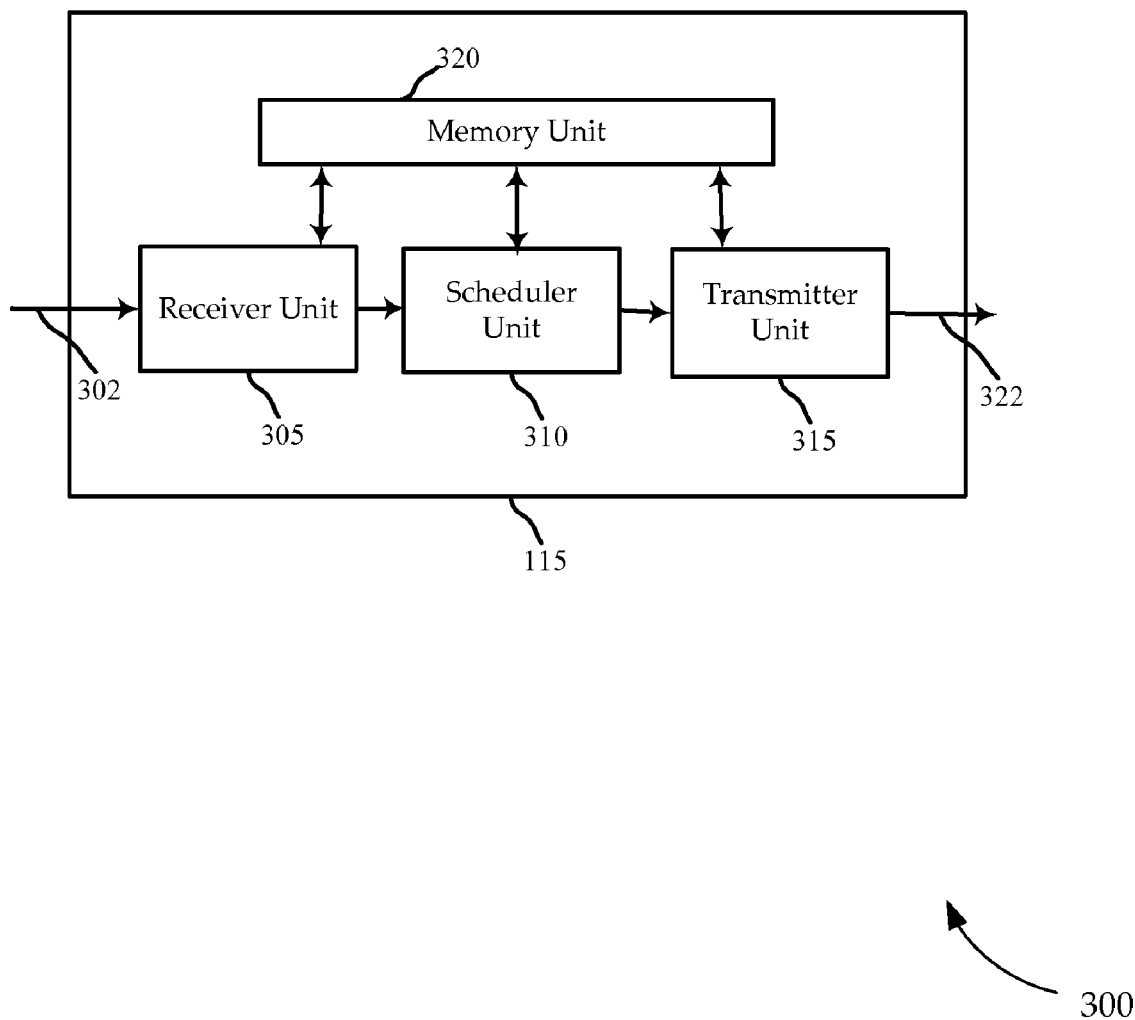
FIGS. 3A and 3B are simplified block diagrams illustrating a gateway and components thereof configured according to various embodiments of the present invention.

In different systems, the modulation and coding format identification and adjustment timing may be undertaken by a range of components by the ground terminal 115, the satellite 105, or any combination thereof. FIG. 3A is a block diagram 300 illustrating a ground terminal including a receiver unit 305, a scheduler 310, a transmitter unit 315, and a memory unit 320. For purposes of this description assume the system 100 of FIG. 1. These components (305, 310, 315, 320) may be implemented, in whole or in part, in hardware. Thus, they may be made up of one, or more, Application Specific Integrated Circuits (ASICs) adapted to perform a subset of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. Each may also be implemented, in whole or in part, with instructions embodied in a computer-readable medium (e.g., the memory unit 320), formatted to be executed by one or more general or application-specific processors.

In one embodiment, the receiver unit 305 receives signals 302 with data including information on slant range distances and orbital pass times, and stores the information in the memory unit 320. The memory unit 320 may also store an association between each of a number of modulation and coding formats and a different set of slant range distances (this may be stored in the form of a table such as the table 200 of FIG. 2A). The scheduler unit 310 may calculate slant range distances associated with the satellite 105 at certain times. The scheduler unit 310 may utilize the calculated slant range distances to identify time periods when the calculated slant range distances fall within selected ones of the different sets of slant range distances. The scheduler unit 310 may then associate each of the identified time periods with an applicable modulation and coding format. The transmitter unit 315 may transmit signals 322 with data identifying the modulation and coding formats and associated time periods (e.g., in the form of a transmission schedule).

In another embodiment, the ground terminal 115 may be configured to schedule adjustment to modulation and coding formats based on slant range distances and other factors.

Figure 3B:
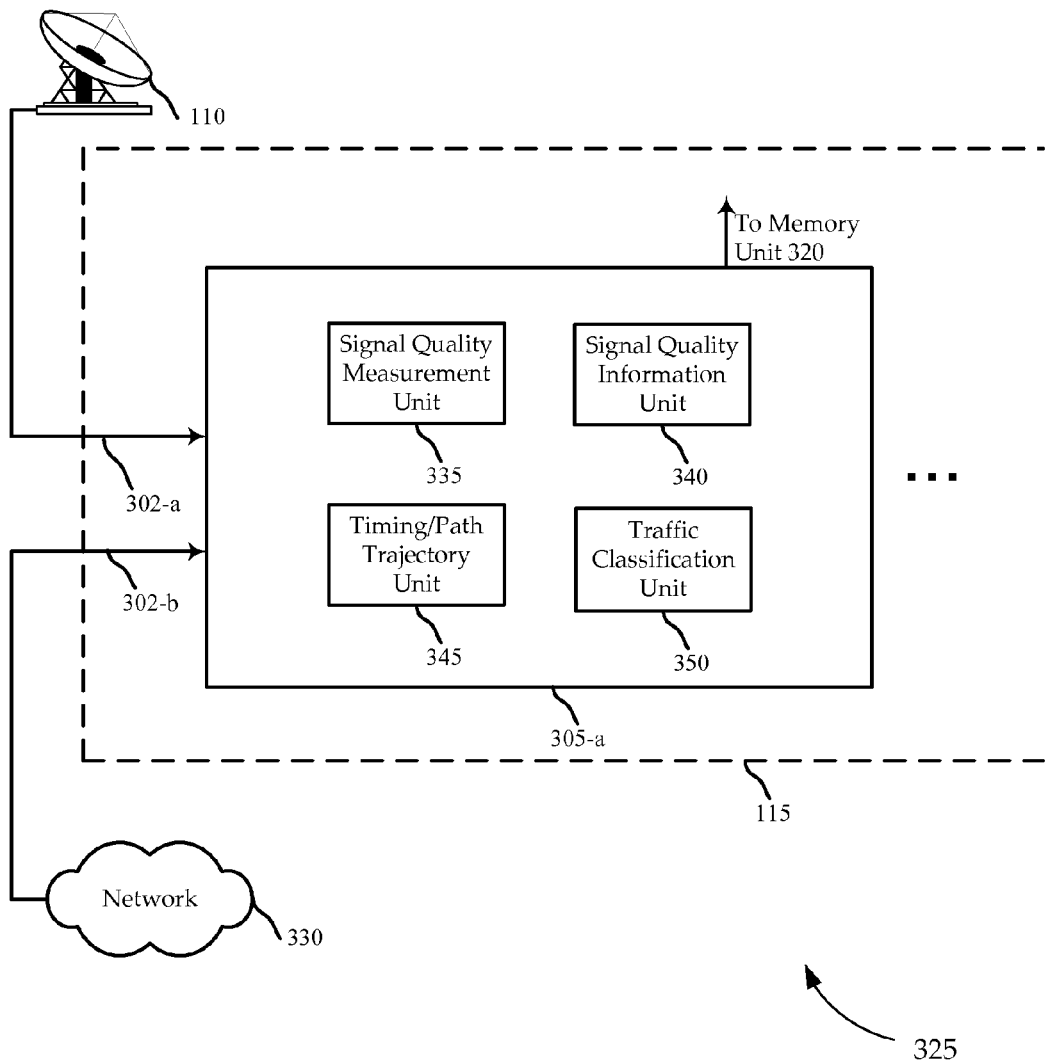

Consider the block diagram in FIG. 3B of a system 325 including a ground terminal 115 with an example embodiment of the receiver unit 305-a. In the illustrated embodiment, the receiver unit 305-a includes a signal quality measurement unit 335, a signal quality information unit 340, a timing/path trajectory unit 345, and a traffic classification unit 350.

The receiver unit 305-a may receive information regarding slant range distances of a particular satellite 105, timing of the orbital pass, elevation information, and a number of other types of data. This information may be a signal 302-a received from a satellite 105 via an antenna 110 connected with the ground terminal 115. Alternatively, the received information may be received from a source (e.g., a server) within a network 330 (e.g., via a terrestrial or wireless connection to the Internet or other public or private network).

The signal quality measurement unit 335 may be configured to measure the signal quality (e.g., bit error rate, signal-to-noise ratio) of a signal received from a satellite 105. Various methods of measuring signal quality are known in the art, and any of these methods may be so used in a manner consistent with this disclosure. The signal quality measurement may be applied to the satellite 105 transmitting the measured signal, or to another satellite. In a deteriorating signal quality environment, lower order modulation and coding may be called for. Thus, distances associated with a set of slant range distances attributed to a given modulation and coding format may be lowered as interference increases.

The signal quality information unit 340 may be configured to receive and process information related to signal quality. For example, information on historic, current, or forecast weather patterns or conditions may be received or measured. Also, information on historic, current, or estimated interference conditions (perhaps based on the weather information, or natural or man made objects) may be received and processed. Various methods of measuring and processing these factors related to signal quality are known in the art, and any of these methods may be so used in a manner consistent with this disclosure. In a deteriorating signal quality environment (e.g., deteriorating weather or other interference conditions), lower order modulation and coding may be called for. Thus, distances associated with a set of slant range distances attributed to a given modulation and coding format may be lowered as interference increases.

The timing/path trajectory unit 345 may be configured to receive and process information related to the path of a satellite and the timing of each orbital pass. For example, information related to the timing and position of satellite may be received. Satellites with different orbital passes (e.g., ninety degree vs. forty-five degree passes) may have different tables (e.g., table 200 of FIG. 2A) for associating slant ranges with modulation and coding formats. Satellites passing lower on the horizon may have different associations than those passing directly above for signal reception. Also, the information on the timing of the orbital passes may be stored in the memory unit 320 (e.g., so that the scheduler unit 310 may generate a schedule of modulation and coding format adjustments to be transmitted to a satellite 105).

A traffic classification unit 350 may receive QoS, other traffic classification information, and bandwidth information. This and the other information received by a receiving unit 305-a may be stored in a memory unit 320. Also, configuration information for the antenna and receiver of a given receiver terminal may be stored in memory unit 320. Returning briefly to FIG. 3A, the scheduler unit 310 may generate a relational table or other data structure associating sets of slant range distances with certain modulation and coding formats for a particular satellite 105. Signal quality measurements, weather, interference, receiver and antenna characteristics may each be used to change or refine the distances associated with each modulation and coding format. The scheduler unit 310 calculates slant range distances associated with the satellite 105 using the information on orbital times from the memory unit 320. The scheduler unit 310 utilizes the calculated slant range distances to identify time periods when the calculated slant range distances fall within selected ones of the different sets of slant range distances. The scheduler unit 310 may associate each of the identified time periods with the applicable modulation and coding format. The transmitter unit 315 may transmit signals 322 with data identifying the modulation and coding formats and associated time periods (e.g., in the form of a transmission schedule).

Figure 4:
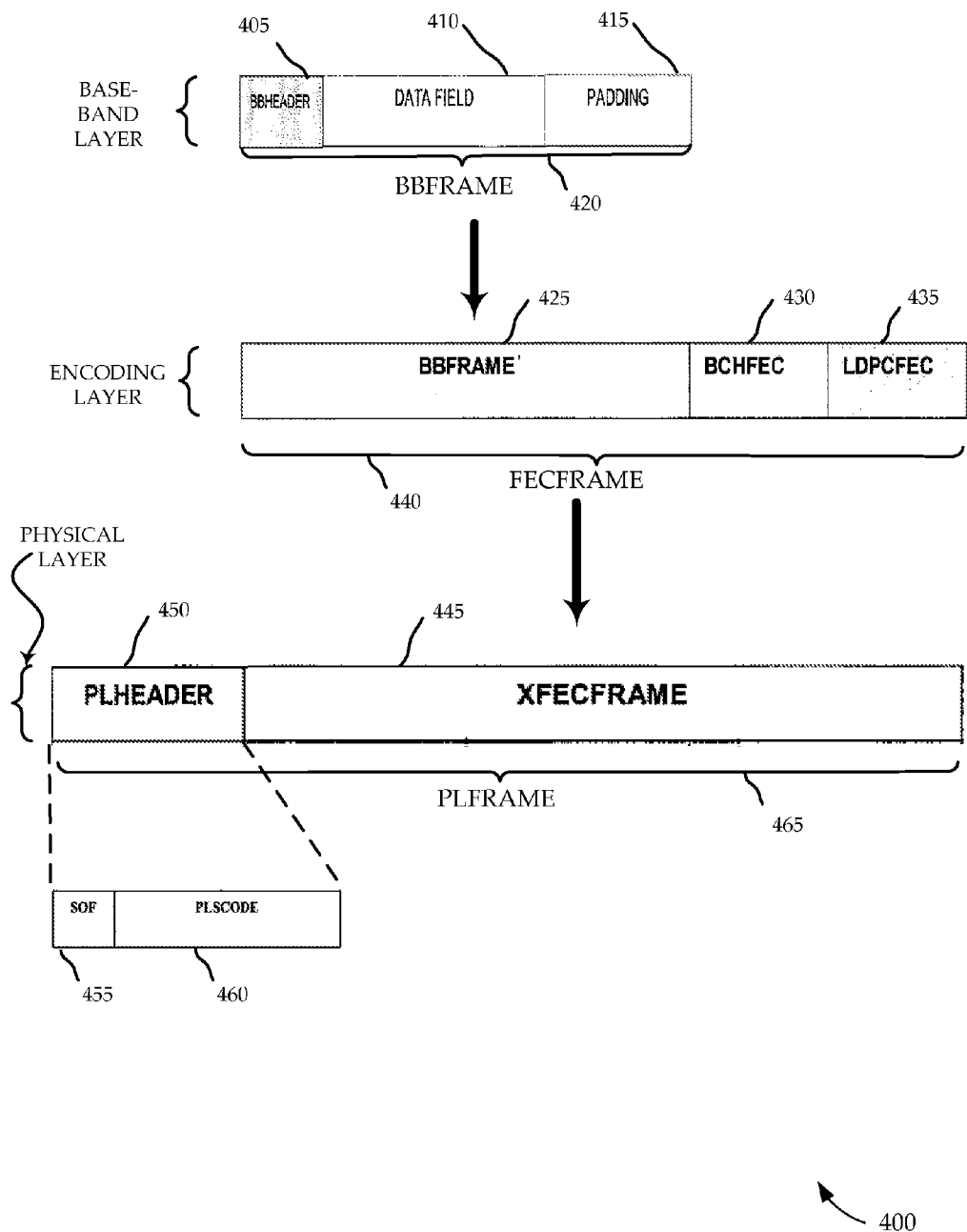
FIG. 4 is a simplified block diagram illustrating a DVB-S2 framing format that may be used to implement adjustable coding and modulation according to various embodiments of the present invention.

To implement the variable modulation and coding scheme described above, a variety of adaptive or variable modulation schemes known in the art may be used. Turning to FIG. 4, the framing format 400 for a frame of a DVB-S2 system is illustrated. The framing format may, for example, be used as the framing format for transmitting sensing data from the satellite 105 to the ground terminal 115 of FIG. 1. While a DVB-S2 system is used as an example, the principles specified herein are applicable to a range of systems.

In this embodiment, a base-band frame 420 is made up of a base-band header 405, a data field 410, and padding 415. Data in the data field may include sensing data from the one or more sensors on a satellite 105. The data field may include addressing information (e.g., IP address, MAC address) indicating the nodes within a network to which the packet will be directed. As will be discussed in more detail below, the size of the data field and padding may vary depending on the modulation and coding format selected for the frame to be constructed.

A given modulation and coding format is associated with the base-band frame 420 (e.g., by accessing the modulation and coding format table 200 of FIG. 2A). Interleaving and FEC encoding (e.g., BCH and LDCP, according to the coding format designation) may then be performed on the base-band frame 420 to produce an encoded base-band frame 425, and outer coding parity bits 430 and inner coding parity bits 435 are appended to produce a FECFRAME 440. The DVB-S2 specification provides that the FECFRAME 440 will be of fixed size regardless of the modulation and coding format used (i.e., normal frame is 64,800 bits, and a shortened frame is 16,200 bits), and this structure may be used in this embodiment. However, in other embodiments, the FECFRAME 440 size may vary according to the modulation and coding format selected for the frame, to produce frames of uniform duration in time.

Continuing with the framing format, the FECFRAME 440 is bit mapped to the applicable constellation (e.g., QPSK, 8PSK, 16APSK, 32APSK, according to modulation and coding format designation), to produce a XFECFRAME 445 made up of symbols representative of the frame contents. A PLHEADER 450 is added to the XFECFRAME 445, together forming the PLFRAME 465. The PLHEADER 450 is made up of a start of frame (SOF) slot 455 of 26 symbols, and a modulation and coding format (PLSCODE) slot 460 of 64 symbols specifying the modcode and size (i.e., whether normal or shortened FECFRAME). The PLHEADER 450 is encoded. The PLFRAME 465 is then baseband-shaped and quadrature-modulated, as well as amplified and upconverted to be transmitted from the satellite 105.

Using this scheme, a particular ground terminal 115 need not know in advance the particular modcode being used. Instead, in one embodiment, only the PLHEADER 450 needs to be decoded, and the modcode can be ascertained thereby. In this way, the ground terminal 115 can receive varying modcodes without the need for two-way communication. It is worth noting that the DVB-S2 system may be modified in a variety of ways, and this system is illustrative only.

Figure 5:
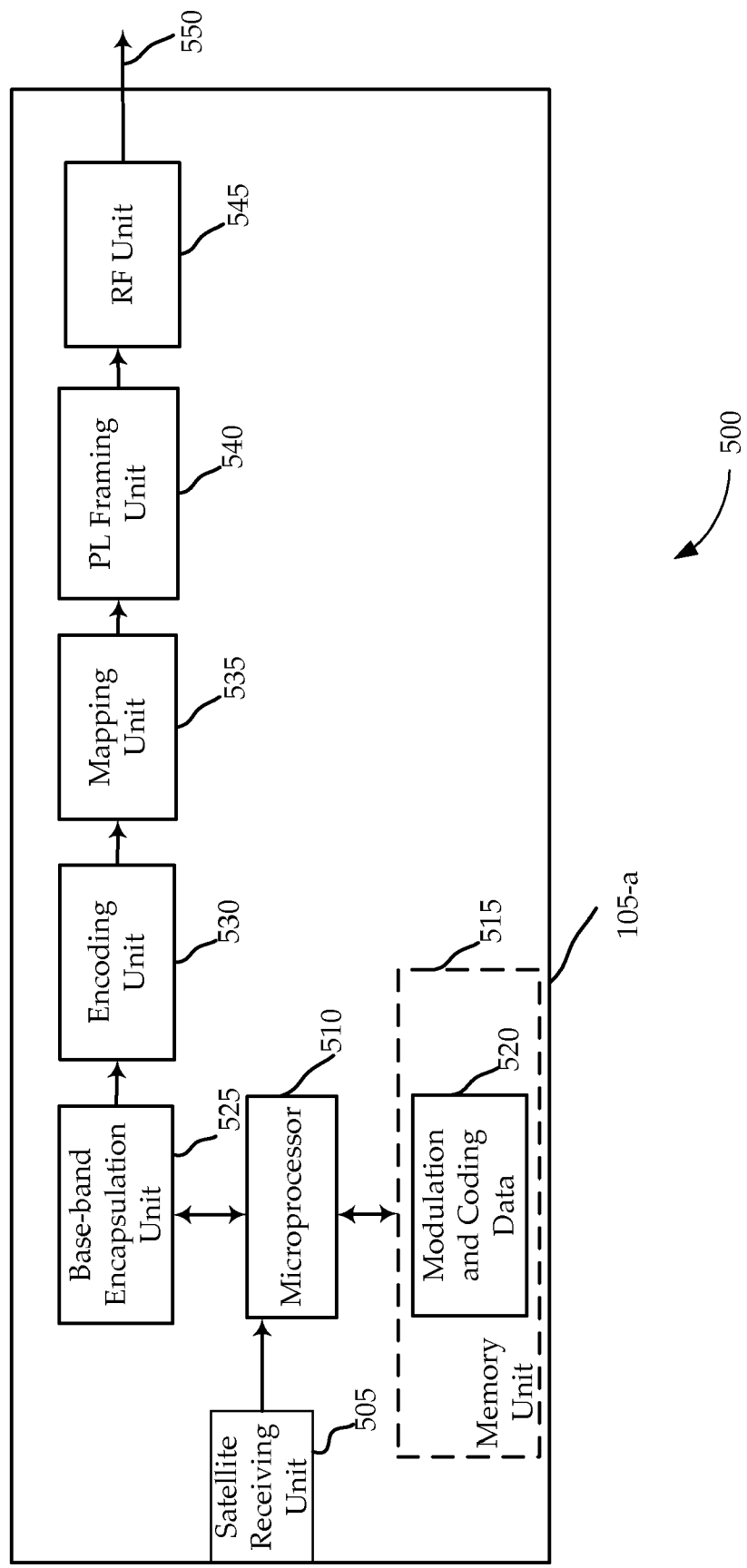
FIG. 5 is a simplified block diagram illustrating transmitter components of a satellite configured according to various embodiments of the present invention.

In different systems, the encapsulation and modulation techniques described above may be undertaken by a range of components. However, for purposes of this description, assume the system 100 of FIG. 1, utilizing the single carrier ACM waveform transmitted by a satellite 105 to a ground terminal 115. FIG. 5 is a block diagram 500 illustrating a satellite 105-a including a receiving unit 505 (e.g., including sensors, and a receiver to process wireless communications received from a ground terminal 115), a microprocessor 510, a memory unit 515, a base-band encapsulation unit 525, an encoding unit 530, a mapping unit 535, a PL framing unit 540, and an RF unit 545. These components (505, 510, 515, 525, 530, 535, 540, and 545) may be implemented, in whole or in part, in hardware. Thus, they may be made up of one, or more, Application Specific Integrated Circuits (ASICs) adapted to perform a subset of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. Each may also be implemented, in whole or in part, with instructions embodied in a computer-readable medium, formatted to be executed by one or more general or application specific processors.

In one embodiment, the satellite receives sensing data via the sensors of the receiving unit 505, and passes the sensing data to the microprocessor 510. Sensing data from different sensors may be grouped together, perhaps in a single packet or set of packets. The sensing data is forwarded to the base-band encapsulation unit 525, perhaps after being processed, formatted, and stored at the memory unit 515.

The microprocessor 510 also determines or otherwise identifies the modulation and coding format to be used for the set of sensing data. To do so, the microprocessor 510 may access the modulation and coding data table 520 in memory 515 to identify the modulation and coding format applicable to a given time or slant range distance. The microprocessor 510 may calculate a slant range distance or time, or may receive such calculations via transmissions from a ground terminal 115. The modulation and coding data table 520 may, for example, be the modulation and coding format table 200 of FIG. 2A or the schedule table 275 of FIG. 2C. Either table may be wirelessly received from a ground terminal 115 via the receiving unit 505 of the satellite. Functions described with reference to the ground terminal 115 may be performed, in whole or in part, by the microprocessor 510.

Note that, in other embodiments, other factors may also be considered in addition to slant range distance in determining a modulation and coding format to be used. For example, 1) satellite elevation degree, 2) historic, current, or forecast weather patterns or conditions, 3) natural and man made objects, 4) historic, current, or estimated interference conditions, 5) other factors specific to a particular ground terminal 115 (e.g., antenna size or configuration, receiver component characteristics), and 6) quality of service (QoS) or traffic characteristics, may be factored into the modulation and coding data table 520 either onboard the satellite 105-a or at the ground terminal 115.

Returning to the base-band encapsulation unit 525, it identifies the modulation and coding format to be used for the ground terminal to which the sensing data is directed (e.g., from the modulation and coding data table 520 via the microprocessor 510). The base-band encapsulation unit 525 encapsulates the sensing data to produce a base-band layer frame (e.g., the base-band frame 420 of FIG. 4, including a header 405, a data field 410, and padding 415). An encoding unit 530 encodes the packet in accordance with the applicable coding (e.g., using BCH and LDCP, according to selected modulation and coding format), and may append parity bits to produce an encoded frame. This may, for example, be a FEC-FRAME 440. The encoded frame then proceeds to the mapping unit 535, which maps the contents of the frame to the constellation of the applicable modulation format (as dictated by the identified modulation and coding format) to produce a frame made up of symbols representative of the encoded frame contents. An encoded physical layer header (indicative of the modcode used), e.g. PLHEADER 450, is added by a PL framing unit 540 to produce a physical layer frame. The physical layer frame 465 is then baseband shaped and quadrature modulated, and also processed by one or more amplifiers and an upconverter by the RF unit 545, to be transmitted to the applicable ground terminal in a downlink signal 550, perhaps via steerable antenna.

It is worth noting that the satellite 105-a of FIG. 5 may be configured with an antenna to receive telecommands from one or more ground terminals 115. Through such telecommands, the parameters for the collection and transmission of the sensing data may be modified. In some embodiments, however, the telecommands are not implemented in real time, instead taking a longer time for implementation and processing (e.g., within the microprocessor).

Figure 6:
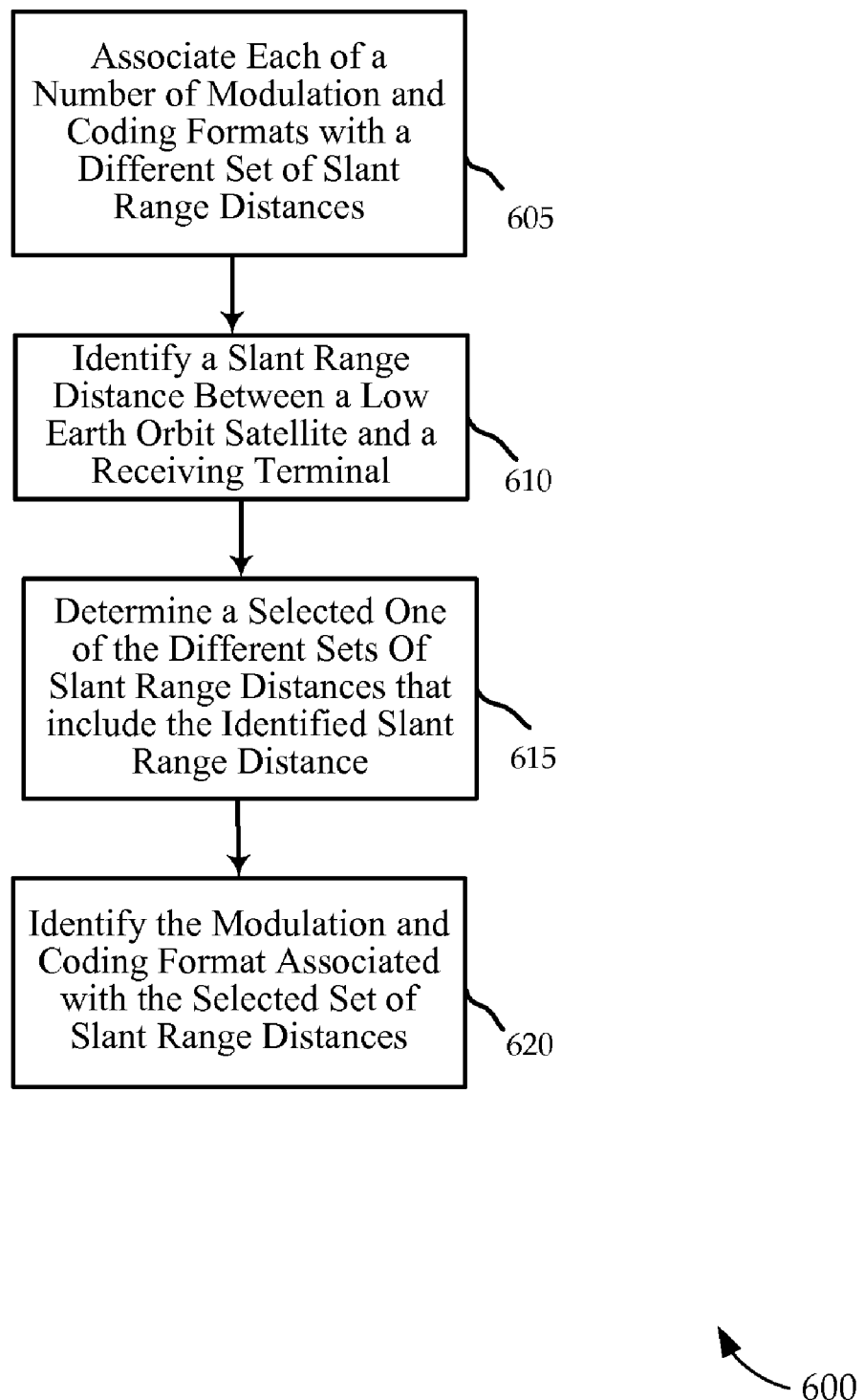
FIG. 6 is a flowchart illustrating a method of adjusting a modulation and coding format based on slant range distances, according to various embodiments of the present invention.

FIG. 6 is a flowchart illustrating a method 600 of adjusting a modulation and coding format for a satellite based on slant range distance, according to various embodiments of the present invention. The method 600 may, for example, be performed in whole or in part by the satellite 105 or ground terminal 115 of FIG. 1, 3, or 5.

At block 605, a number of modulation and coding formats are each associated with a different set of slant range distances. At block 610, a slant range distance between a low earth orbit satellite and a receiving terminal is identified. At block 615, the set of slant range distances that include the identified slant range distance is determined. At block 620, the modulation and coding format associated with the selected set of slant range distances is identified.

Figure 7:
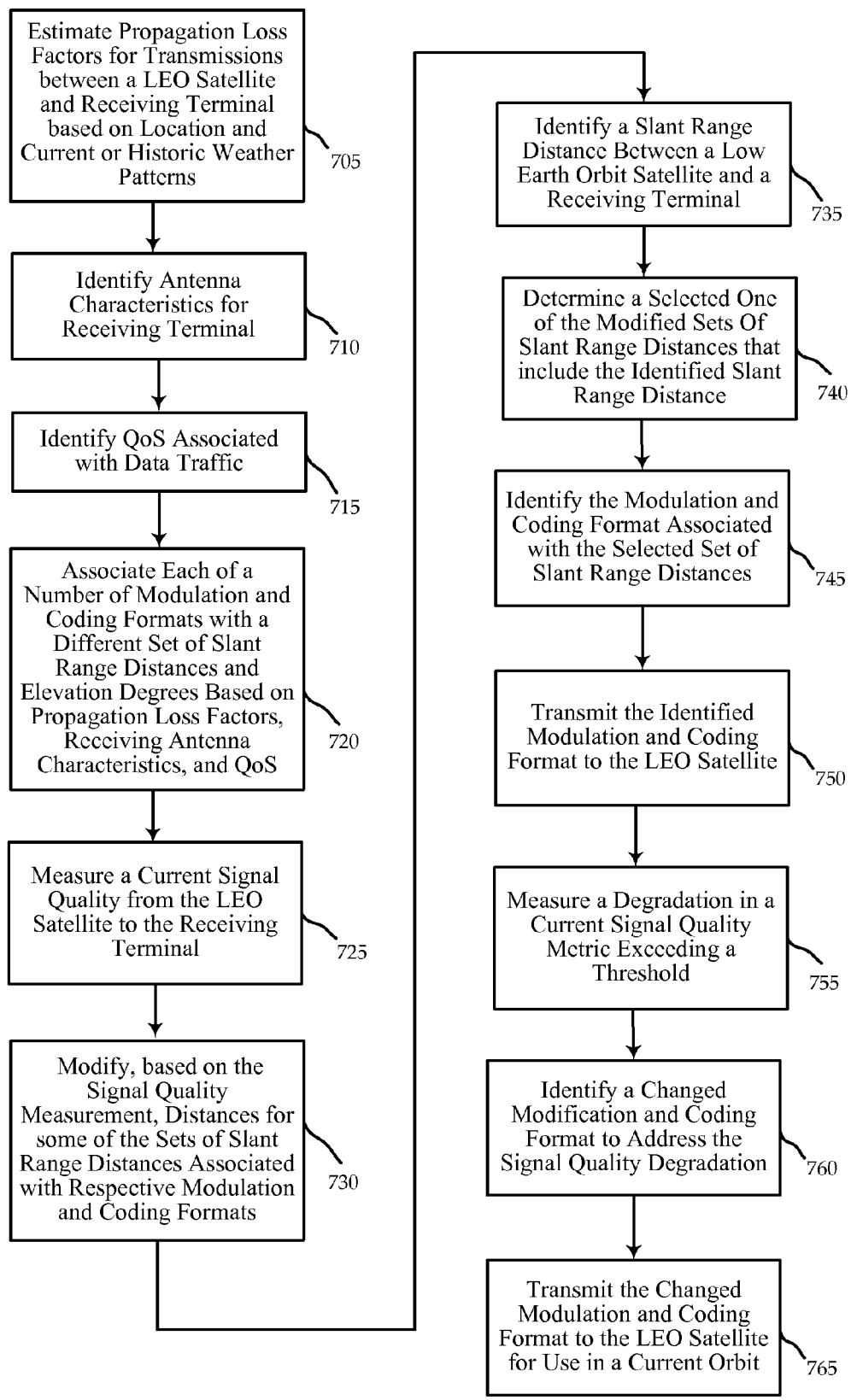
FIG. 7 is a flowchart illustrating a method of adjusting a modulation and coding format based on slant range distances and additional factors, according to various embodiments of the present invention.

FIG. 7 is a flowchart illustrating a method 700 of adjusting a modulation and coding format for a satellite transmission to a receiving terminal based on slant range distance and other factors, according to various embodiments of the present invention. The method 700 may, for example, be performed in whole or in part by the satellite 105 or ground terminal 115 of FIG. 1, 3, or 5.

At block 705, propagation loss factors for transmissions between a LEO satellite and receiving terminal are estimated based on the location of the receiving terminal (e.g., relative to the satellite) and current or historic weather patterns (e.g., for the location). At block 710, antenna characteristics for the receiving terminal are identified. At block 715, a quality of service metric associated with the particular data traffic to be transmitted from the LEO satellite to the receiving terminal is identified.

At block 720, a number of modulation and coding formats are each associated with a different set of slant range distances and elevation degrees based on the propagation loss factors, receiving antenna characteristics, and quality of service metrics. Thus, for a given set of propagation loss factors, receiving antenna characteristics, and quality of service metrics, each set of slant range distances for a satellite at a given elevation degree may be assigned a particular modulation and coding format. This association of modulation and coding formats with slant range distances may be in the form of a table, such as the table 200 of FIG. 2A, or may be made using other relational data structures.

At block 725, a current signal quality is measured from the LEO satellite to the receiving terminal. At block 730, distances associated with some sets of slant range distances associated with respective modulation and coding formats are modified based on the signal quality measurement. For example, with deteriorating signal quality, a lower order modulation may be called for, and thus distances associated with particular modulation and coding formats may be shortened.

At block 735, a slant range distance is identified between a LEO satellite and a receiving terminal. At block 740, it is determined that a selected one of the modified sets of slant range distances include the identified slant range distance. At block 745, the modulation and coding format associated with the selected set of slant range distances is identified. At block 750, the identified modulation and coding format is transmitted to the LEO satellite.

At block 755, a degradation in a current signal quality metric is measured, the degradation exceeding a threshold. At block 760, a changed modification and coding format is identified to address the signal quality degradation. At block 765, the changed modulation and coding format is transmitted to the LEO satellite for use in a current orbit.

Figure 8:
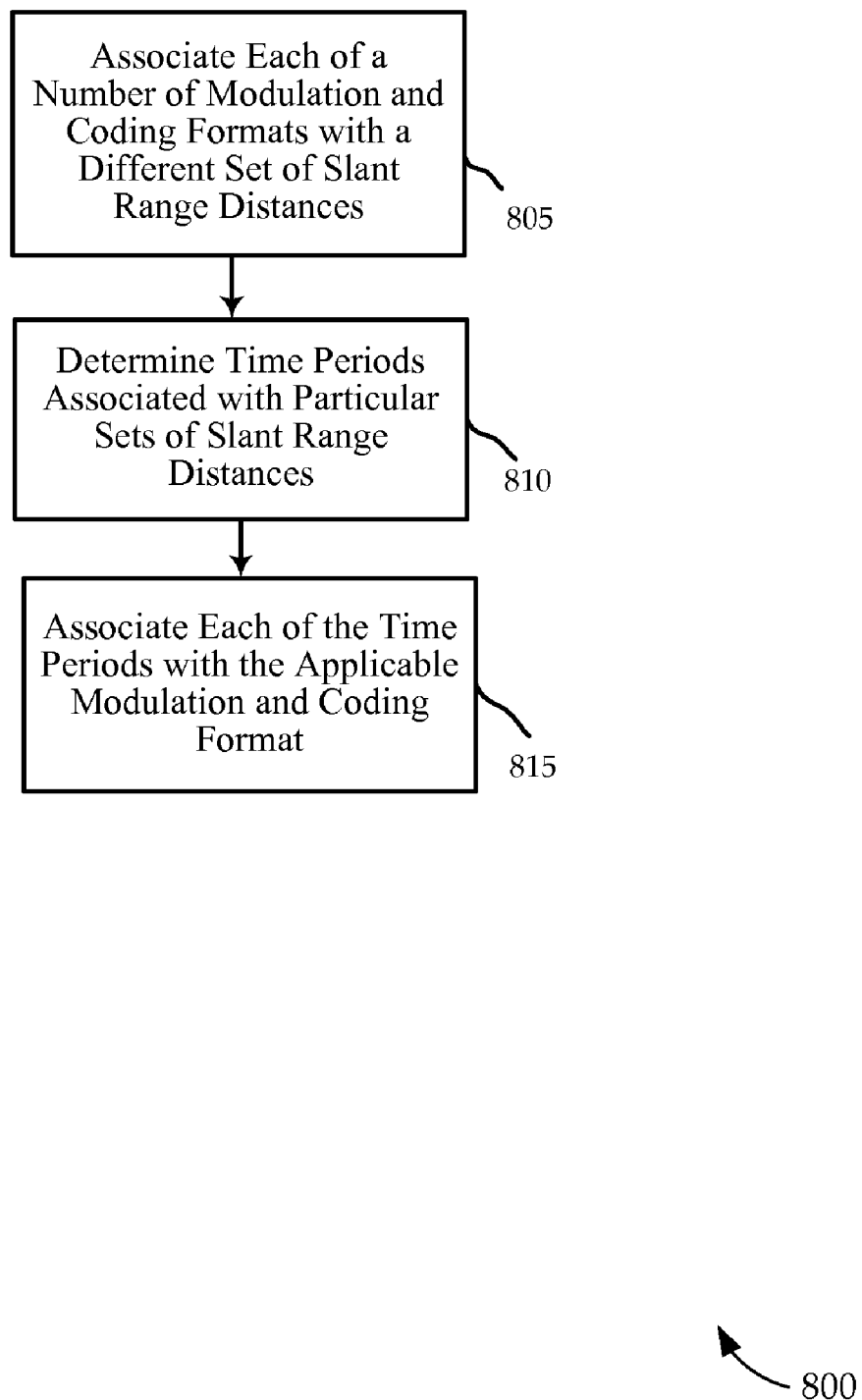
FIG. 8 is a flowchart illustrating a method of establishing a timing schedule for adjusting a modulation and coding format based on slant range distances, according to various embodiments of the present invention.

FIG. 8 is a flowchart illustrating a method 800 of setting time periods for adjusting a modulation and coding format for a satellite transmission to a receiving terminal based on slant range distances, according to various embodiments of the present invention. The method 800 may, for example, be performed in whole or in part by the satellite 105 or ground terminal 115 of FIG. 1, 3, or 5.

At block 805, a number of modulation and coding formats are each associated with a different set of slant range distances. At block 810, certain periods of time are each associated with selected sets of slant range distances. For example, the slant range distance between a satellite and a ground terminal may be calculated for specific points in time. Then, for each set of slant range distances, the times when the calculated slant range distance falls within a given set of slant range distances may be accumulated to identify the time periods when a satellite is within the different sets of slant range distances. At block 815, the identified time periods are associated with the applicable modulation and coding format.

Figure 9:
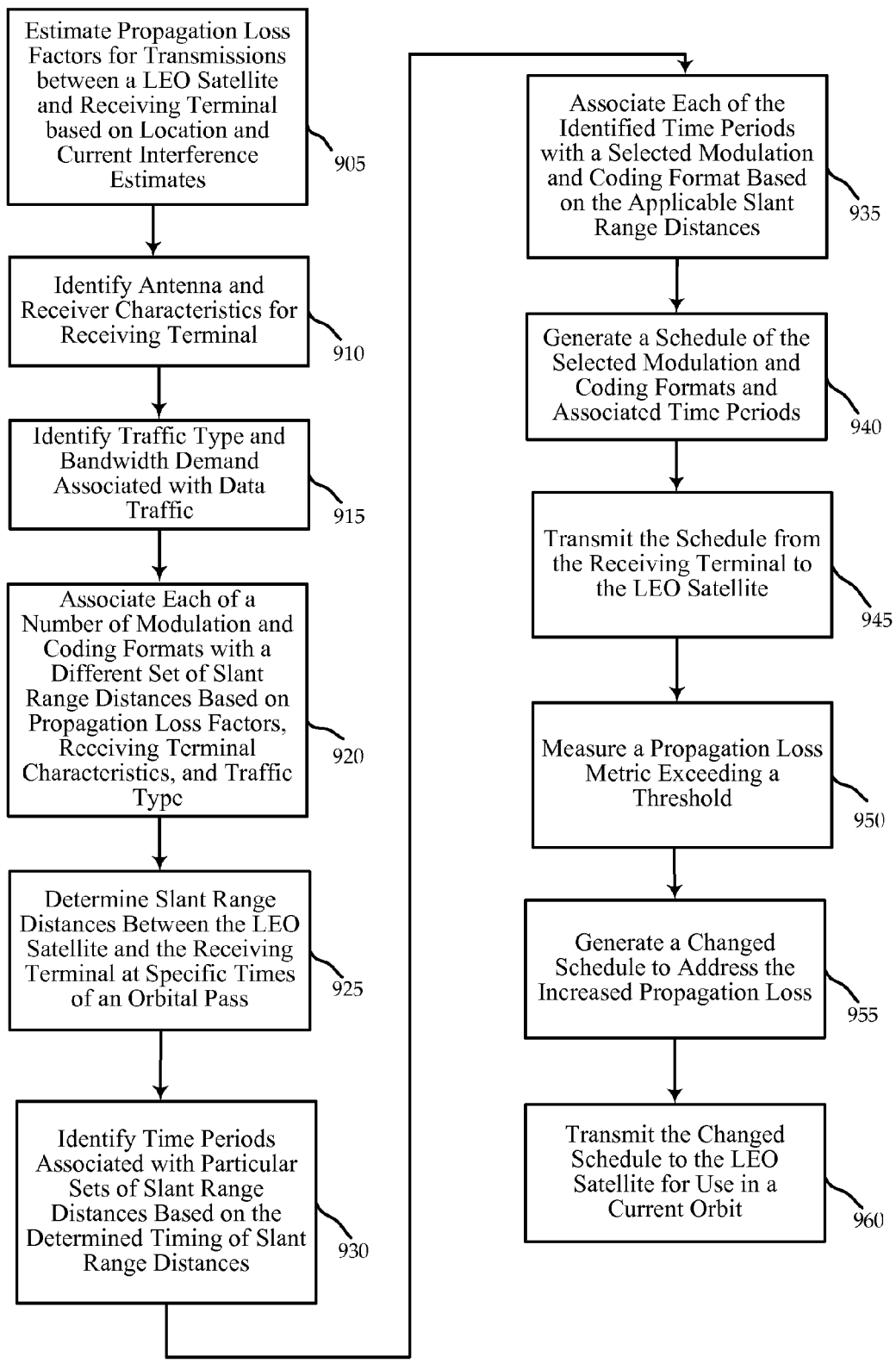
FIG. 9 is a flowchart illustrating a method of establishing a timing schedule for adjusting a modulation and coding format based on slant range distances and additional factors, according to various embodiments of the present invention.

FIG. 9 is a flowchart illustrating a method 900 of setting up schedules for adjusting a modulation and coding format for a satellite transmission to a receiving terminal based on slant range distances and other factors, according to various embodiments of the present invention. The method 900 may, for example, be performed in whole or in part by the satellite 105 or ground terminal 115 of FIG. 1, 3, or 5.

At block 905, propagation loss factors are estimated for transmissions between a LEO satellite and a receiving terminal based on location and current interference estimates. At block 910, antenna and receiver characteristics are identified for the receiving terminal. At block 915, traffic type and bandwidth demands associated with data traffic are identified.

At block 920, each of a number of modulation and coding formats are then associated with a different set of slant range distances based on the propagation loss factors, receiving terminal characteristics, and traffic type. At block 925, slant range distances between the LEO satellite and the receiving terminal are determined for specific times of an orbital pass.

At block 930, time periods associated with particular sets of slant range distances are determined based on the slant range distance timing determinations. At block 935, each of the identified time periods are associated with a selected modulation and coding format (e.g., based on the set of slant range distances associated with each format at block 920).

At block 940, a schedule of the selected modulation and coding formats and associated time periods is generated. At block 945, the schedule is transmitted from the receiving terminal to the LEO satellite. At block 950, a propagation loss metric is measured exceeding a threshold (e.g., measured at the receiving terminal due to interference from a harsh thunderstorm). At block 955, a changed timing schedule is generated to address the increased propagation loss. At block 960, the changed schedule is transmitted to the LEO satellite (e.g., by the receiving terminal) for use in a current orbit.

It should be again noted that the methods, systems, and devices discussed above are intended merely to be exemplary in nature. It must be stressed that various embodiments may omit, substitute, or add various procedures or components as appropriate. For instance, it should be appreciated that in alternative embodiments, the methods may be performed in an order different than that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow chart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure.

Moreover, as disclosed herein, the terms "memory" and memory unit may represent one or more devices for storing data, including read only memory (ROM), random access memory (RAM), magnetic RAM, core memory, magnetic disk storage media, optical storage media, flash memory devices or other machine readable media for storing information. The term "machine readable medium" includes, but is not limited to, portable or fixed storage devices, optical storage devices, wireless channels, a sim card, other smart cards, and various other media capable of storing, containing or carrying instructions or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be required before the above elements are considered. Accordingly, the above description should not be taken as limiting the scope of the invention.

What is claimed is:

1. A satellite communications system configured to change a modulation and coding format applied to a downlink according to slant range distances, the system comprising:
   a ground terminal configured to:
      associate each of a plurality of modulation and coding formats with a different set of slants range distances;
      identify a slant range distance between a low earth orbit satellite and the ground terminal;
      determine a selected one of the different sets of slant range distances including the identified slant range distance;
      identify a selected one of the plurality of modulation and coding formats associated with the selected set of slant range distances; and
      transmit data identifying the selected modulation and coding format; and
   the low earth orbit satellite, in wireless communication with the ground terminal, and configured to:
      receive the selected modulation and coding format from the ground terminal; and
      transmit data to the ground terminal utilizing the selected modulation and coding format.

2. The system of claim 1, wherein the ground terminal is further configured to:
   measure a signal quality for a signal received from the low earth orbit satellite; and
   modify distances associated with at least a subset of the different sets of slant range distances based on the measured signal quality.

3. The system of claim 2, wherein,
   the ground terminal is further configured to transmit a changed modulation and coding format to the low earth orbit satellite because the identified slant range distance is associated with the changed modulation and coding format due to the modification to the selected set of slant range distances; and
   the low earth orbit satellite is further configured to utilize the changed modulation and coding format on a current orbit over the ground terminal.

4. The system of claim 1, wherein the ground terminal is further configured to:
   estimate interference conditions between the low earth orbit satellite and the receiving terminal for a time period; and
   modify distances associated with at least a subset of the different sets of slant range distances for the time period based on the estimated interference conditions.

5. The system of claim 1, wherein the ground terminal is further configured to:
   establish the different sets of slant range distances based at least in part on characteristics of the ground terminal antenna and receiver configuration.

6. A method of identifying a modulation and coding format according to slant range distances, the method comprising:
   associating each of a plurality of modulation and coding formats with a different set of slant range distances, wherein the association is based at least in part on signal quality measurements performed by a receiving terminal;
   identifying a slant range distance between a low earth orbit satellite and a receiving terminal;
   determining a selected one of the different sets of slant range distances including the identified slant range distance;
   identifying a selected one of the plurality of modulation and coding formats associated with the selected set of slant range distances; and
   transmitting the selected modulation and coding format from the receiving terminal to the low earth satellite.

7. The method of claim 6, further comprising:
   transmitting data to the receiving terminal utilizing the selected modulation and coding format.

8. The method of claim 6, further comprising:
   measuring a signal quality for a signal from the low earth orbit satellite to the receiving terminal; and
   dynamically changing the selected modulation and coding format based at least in part on the measured signal quality.

9. The method of claim 6, further comprising:
   estimating interference from current weather conditions for a signal transmitted between the low earth orbit satellite to the receiving terminal; and
   transmitting the changed modulation and coding format to be used based on the estimated interference.

10. The method of claim 9, wherein,
    the selected modulation and coding format comprises a first modulation mode and a first code rate; and
    the changed modulation and coding format comprises the first modulation mode and a second code rate.

11. The method of claim 6, further comprising:
    estimating, for a future time period, whether a propagation loss from the low earth orbit satellite to the receiving terminal will exceed a threshold; and
    modifying distances associated with at least a subset of the different sets of slant range distances for the future time period based on the estimated propagation loss.

12. The method of claim 6, further comprising:
    establishing the different sets of slant range distances based at least in part on characteristics of the receiving terminal antenna.

13. A method for adapting a modulation and coding format according to slant range distances, the method comprising:
    associating each of a plurality of modulation and coding formats with a different set of slant range distances;
    identifying time periods associated with each of at least a subset of the different sets of slant range distances;
    associating each of the identified time periods with a selected one of the modulation and coding formats;
    generating a schedule of the selected modulation and coding formats and associated time periods; and
    transmitting the schedule from a receiving terminal to a low earth orbit satellite configured to transmit the selected modulation and coding formats at the associated time periods.

14. The method of claim 13, further comprising:
    transmitting data to the receiving terminal utilizing the selected modulation and coding format.

15. The method of claim 13, further comprising:
    determining a plurality of slant range distances between a low earth orbit satellite and a receiving terminal at specific times of an orbital pass, wherein the time periods associated with the different sets of slant range distances are identified based at least in part on the determined slant range distances.

16. The method of claim 13, further comprising:
estimating a propagation loss from a low earth orbit satellite to a receiving terminal; and
modifying at least a subset of the identified time periods based at least in part on the propagation loss estimate.

17. The method of claim 13, further comprising:
measuring a signal quality for a signal transmitted between a low earth orbit satellite and a receiving terminal, wherein the measured signal quality comprises a signal-to-noise ratio, a bit error rate, an alternative measure of propagation loss, or other signal quality metrics; and
establishing the different sets of slant range distances based at least in part on the measured signal quality.

18. A terminal for transmitting data identifying a modulation and coding format, the ground terminal comprising:
a memory unit configured to store an association between each of a plurality of modulation and coding formats with a different set of slant range distances;
a scheduler unit, communicatively coupled with the memory unit, and configured to:
calculate slant range distances associated with a low earth orbit satellite over time;
utilize the calculated slant range distances to identify time periods each associated with selected ones of the different sets of slant range distances; and
associate each of the identified time periods with a selected one of the modulation and coding formats; and
a transmitter unit, communicatively coupled with the scheduler unit, and configured to transmit information comprising an identification of the modulation and coding formats and associated time periods.

19. The terminal of claim 18, wherein the scheduler unit is further configured to:
generate a schedule of the selected modulation and coding formats and associated time periods, wherein the schedule comprises the transmitted information.

20. The terminal of claim 18, further comprising:
a receiver unit configured to receive a signal transmitted according to the identified modulation and coding formats during the associated time periods.

21. The terminal of claim 20, wherein,
the receiver unit is further configured to estimate a propagation loss associated with the received signal; and
the scheduler unit, communicatively coupled with the receiver unit, is further configured to modify the modulation and coding format associated with at least a subset of one or more of the associated time periods.

* * * * *